Dec. 11, 1951     J. E. CHAMBERS     2,578,227
ROTATABLE BURNER SUPPORT
Filed Nov. 8, 1948     2 SHEETS—SHEET 1
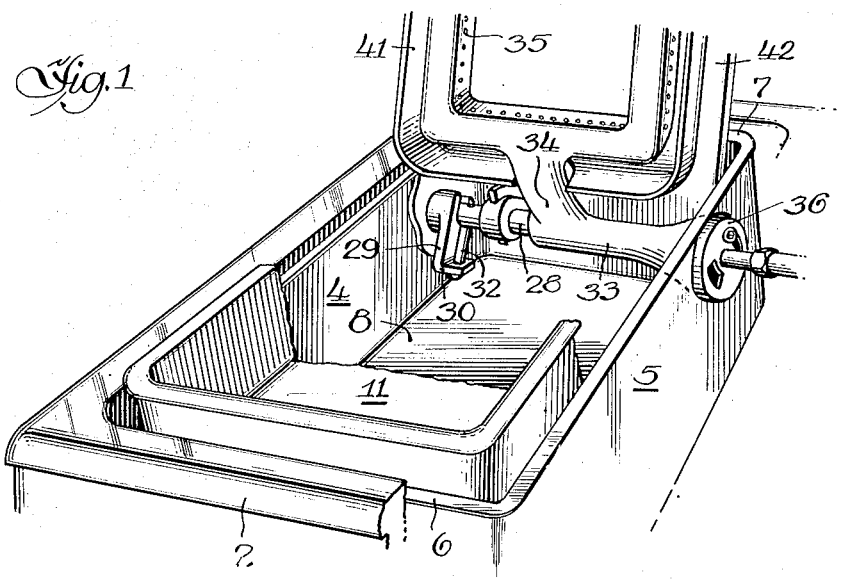
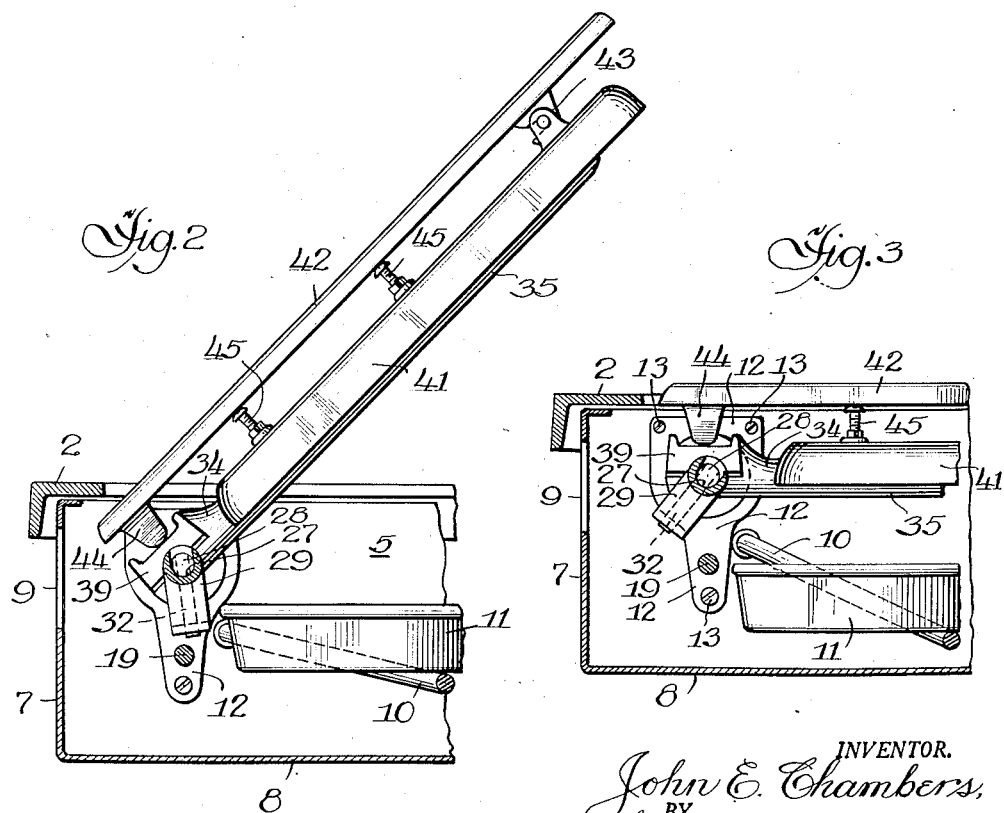
INVENTOR.
John E. Chambers,
BY Schneider & Dressler,
Attys.

Dec. 11, 1951     J. E. CHAMBERS     2,578,227
ROTATABLE BURNER SUPPORT
Filed Nov. 8, 1948     2 SHEETS—SHEET 2
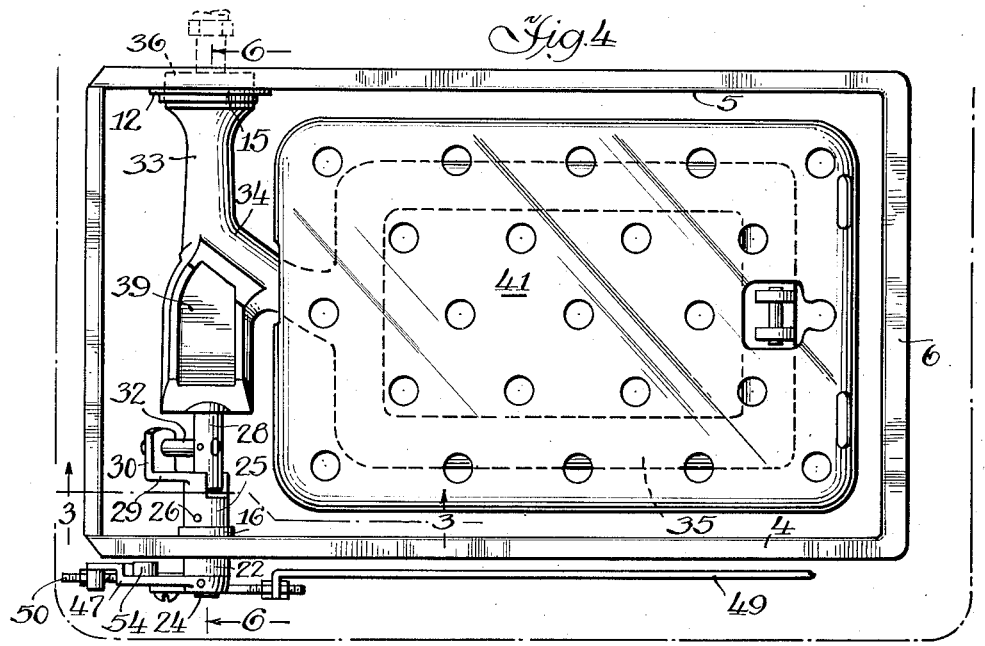
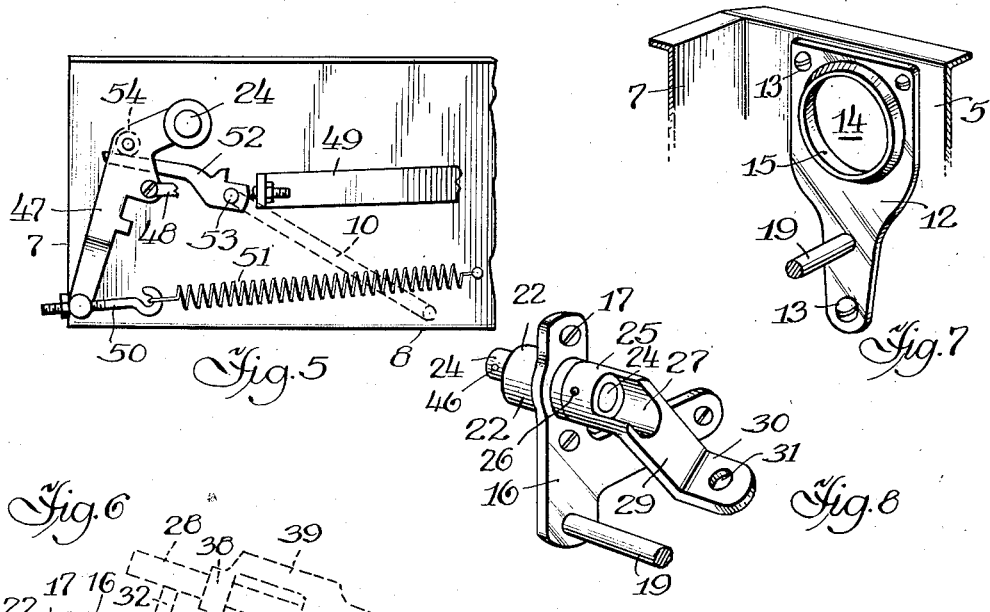
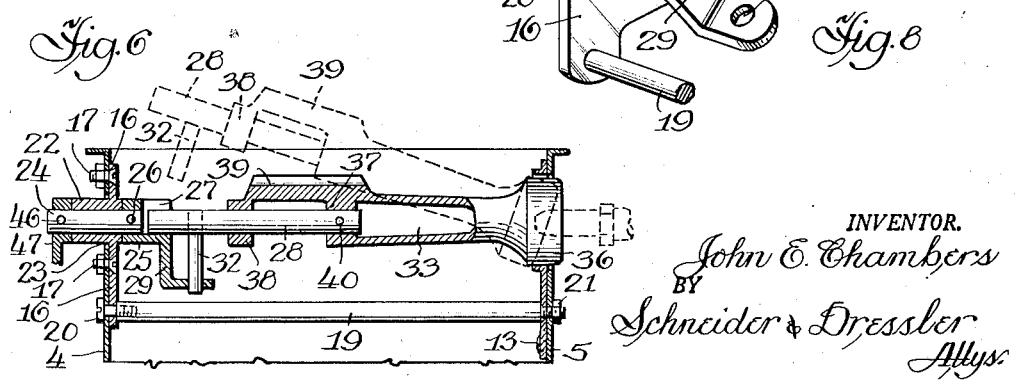
INVENTOR.
John E. Chambers
BY Schneider & Dressler
Attys.

Patented Dec. 11, 1951

2,578,227

UNITED STATES PATENT OFFICE 2,578,227

ROTATABLE BURNER SUPPORT

John E. Chambers, Shelbyville, Ind., assignor to Chambers Corporation, a corporation of Indiana Application November 8, 1948, Serial No. 58,917

9 Claims. (Cl. 126—41)

1

This invention relates to a rotatable gas burner support for use with a combination broiler and griddle in a gas range.

In my prior Patent No. 2,011,848, I have disclosed a combination broiler and griddle heated by means of a gas burner which is rotatably mounted in the broiler box. The present invention relates to the same general subject matter, but pertains particularly to a much simpler rotatable burner mounting construction that is cheaper to manufacture and easier to assemble. The operation of removing the burner, for cleaning or other purposes, has also been made easier by the rotatable burner mounting of the present invention.

Another feature of the present invention is the provision of a tension spring acting against the force of gravity to facilitate lifting the burner, broiler and griddle, and holding them in their raised position.

The structure by which the above advantages are attained will be described in the following specification, taken in conjunction with the accompanying drawings, in which:

Figure 1 is a fragmentary perspective view of a combination broiler and griddle, with parts broken away to facilitate illustration of the burner support structure, the burner, broiler and griddle being shown in raised position;

Fig. 2 is a fragmentary sectional view through the broiler box, showing in side elevation, the burner, broiler and griddle in a raised position intermediate that shown in Fig. 1;

Fig. 3 is a fragmentary sectional view through the broiler box, taken along the line 3—3 of Fig. 4, showing the burner, broiler and griddle in the normal, or cooking position;

Fig. 4 is a top plan view of the assembly in the position shown in Fig. 3, with the griddle removed, to facilitate illustration of the burner support;

Fig. 5 is a fragmentary side elevation of one corner of the broiler box, showing the operating linkage for raising or lowering the burner, broiler and griddle;

Fig. 6 is a cross sectional view, taken along the line 6—6 of Fig. 4, showing the burner support in normal position in solid lines, and in position about to be assembled with the broiler box in dotted lines;

Fig. 7 is a detail perspective view showing the bracket and bearing in which one end of the burner support is mounted; and Fig. 8 is a detail perspective view showing the coupling in which the other end of the burner support is mounted.

2

In the drawings, the reference numeral 2 indicates the top of a gas range having a broiler box mounted therein, with its open top seated just below an opening of approximately the same size in the top of the range. The broiler box comprises a pair of side walls 4 and 5, a pair of end walls 6 and 7, and a bottom wall 8. A flue opening 9 is provided in end wall 7.

A pair of yokes 10 have their ends rotatably mounted in side walls 4 and 5. Yokes 10 are operatively connected so that when one yoke is rotated the other yoke rotates with it. The mechanism for rotating yokes 10 will be hereinafter described. A broiler pan 11 is supported in the broiler box by means of these yokes, and is lifted to the top of the broiler box and lowered to its cooking position by the rotation of the yokes.

A bracket 12 is secured to side wall 5 by means of metal screws 13. Bracket 12 is provided with an aperture 14 registering with a similar aperture in side wall 5. A circular flange 15, extending inwardly at right angles to bracket 12, surrounds aperture 14 and serves as a bearing for one end of the burner support.

A bracket 16, transversely aligned with bracket 12, is secured to side wall 4 by means of metal screws 17. A rod 19, extending across the broiler box, is secured to side walls 4 and 5, as indicated at 20 and 21, and serves as a brace to stiffen the side walls and hold them in proper relationship. Bracket 16 has a bearing 22 projecting through an aperture 23 in side wall 4. A stub shaft 24 is rotatably mounted in bearing 22.

A coupling 25 fits over the end of stub shaft 24 which projects inside the broiler box. A pin 26 secures coupling 25 to stub shaft 24 rigidly so that when the stub shaft is rotated the coupling will rotate with it. Coupling 25 is provided with a seat 27 in which one end of a shaft 28 is supported. This shaft is a portion of the burner support. The top of seat 27 is open so that the end of shaft 28 may be dropped into the seat without difficulty. A flange 29, extending downwardly at right angles to coupling 25 adjacent seat 27, has a lip 30 projecting at right angles thereto. Lip 30 is provided with an aperture 31.

A cross pin 32 is drive-fitted in shaft 28 near the end which is supported in seat 27. Pin 32 is positioned in aperture 31 when the end of shaft 28 is dropped into seat 27. The interengagement of pin 32 and aperture 31 causes shaft 28 to rotate when stub shaft 24 is rotated. If desired, the pin and aperture may be reversed so that the pin would project from lip 30 to engage an aperture in the end of shaft 28. In either event it is desirable that the diameter of the aperture be large enough to provide reasonable clearance for insertion of the pin.

The burner neck 33 comprises a Y-shaped member, the stem of which is a hollow shaft communicating with a hollow shaft 34 comprising one branch of the Y. Hollow shaft 34 leads directly to burner 35, with which it is integral, and cooperates with the stem in bringing a combustible mixture of gas and air from the mixing bell 36 to the burner. Mixing bell 36 is positioned at the terminal of the stem and is rotatably mounted in bearing 15. The other branch of burner neck 33 comprises a wall portion 37 closing off the hollow portion of the burner neck, a disk 38 spaced from and parallel with wall portion 37, and a horizontal platform 39 connecting the top edge of disk 38 with wall portion 37.

Shaft 28 projects through disk 38 and wall portion 37. The engagement of shaft 28 with wall portion 37 is gas tight so that no gas can leak from hollow shaft 34. A pin 40 secures the end of shaft 28 to wall portion 37 so that rotation of shaft 28 will rotate burner neck 33 in bearing 15. Since burner neck 33 is integral with burner 35, rotation of shaft 28 will raise or lower the burner, depending upon the direction of the rotational movement.

A reflector shield 41 is positioned in spaced relationship to the top surface of burner 35. A griddle 42 is removably secured at one end to burner 35, as indicated at 43. Griddle 42 is positioned above the reflector shield. The end of griddle 42 opposite the connection 43 is spaced from burner 35 by means of an integral boss 44 depending from the lower surface of the griddle and engaging the top surface of platform 39. The intermediate area of griddle 42 and reflector shield 41 are maintained in the desired spaced relationship to each other and to burner 35 by spacers 45 which prevent the griddle from sagging even when subjected to heat. The reflector shield and the spacing means for holding it in proper relationship to burner 35 and griddle 42 are more fully described in my copending application, Serial No. 55,093, filed October 18, 1948.

The end of stub shaft 24 which projects outside the broiler box has a pin 46 which holds an arm 47 to the stub shaft. As seen in Figs. 4 and 5, a link 48 connects arm 47 to a bar 49 which may be reciprocated in a forward and rearward direction. Bar 49 may be moved manually, or by means of any suitable mechanism. An eye bolt 50 is secured to the lower end of arm 47 and is engaged by one end of a tension spring 51. The other end of tension spring 51 is connected directly to side wall 4 of the broiler box or to a stud projecting therefrom.

When bar 49 is moved forwardly, arm 47 moves forwardly about its pivot, and stub shaft 24 rotates. Since pin 26 holds stub shaft 24 rigid with respect to coupling 25 and pin 32 prevents relative rotation between coupling 25 and shaft 28, it is obvious that the rotation of stub shaft 24 causes shaft 28 to rotate in the same direction. Pin 40 holds shaft 28 rigid relative to burner neck 33. Accordingly, when shaft 28 is rotated, burner 35, reflector shield 41 and griddle 42 are also rotated. When the movement of bar 49 is forward, the burner, reflector shield and griddle are lifted from their normal or cooking position.

Spring 51 exerts a constant force on arm 47 forwardly about its pivot, thereby reducing the force necessary to be exerted in moving bar 49 forwardly. The force of spring 51 is sufficient to hold the burner, reflector shield and griddle in raised position after they have been raised out of the broiler box. The weight of burner 35 and the other moving parts is such that when bar 49 is moved rearwardly, the force of gravity substantially offsets the force of tension spring 51 so that only a small amount of force need be exerted to move the parts downwardly to their normal or cooking position against the action of spring 51.

A lever 52 is pivoted to side wall 4 of the broiler box, as indicated at 53. The end of one yoke 10 is rigidly secured to lever 52 at its axis so that when lever 52 is rotated it rotates both yokes 10, since they are interconnected, to raise the yokes and broiler pan 11 which rests on the yokes. Lever 52 is rotated by means of a projection 54 mounted on arm 47. When arm 47 is rotated in a direction to lift burner 35, projection 54 engages the top of lever 52 adjacent its end to depress it, thereby rotating it about its pivot 53. When arm 47 is rotated in the opposite direction so that projection 54 is moved out of engagement with lever 52, the weight of yokes 10 and of broiler pan 11 will cause them to move downwardly to their normal position.

From the foregoing description it will be seen that I have devised a burner support that is exceedingly simple in construction and assembly. In order to position the burner in the broiler box it is necessary only to insert mixing bell 36 in bearing 15 in the position indicated in dotted lines in Fig. 6. Pin 32 is then aligned with aperture 31 in lip 30, and the end of shaft 28 is dropped into seat 27 of coupling 25. In lifting or lowering the parts in the broiler box, tension spring 51 substantially equalizes the force of gravity so that the parts may be easily lifted or lowered without the exercise of a great amount of force, and without slamming at either end of the movement.

Although I have described a preferred embodiment of my invention in considerable detail, it will be understood that the description is intended to be illustrative, rather than restrictive, as many details may be modified or changed without departing from the spirit or scope of the invention. Accordingly, I do not desire to be restricted to the exact structure described.

I claim:

1. In a broiler box, a pair of aligned bearings, a gas burner having a neck rotatably supported in one of said bearings a shaft rigidly secured to said neck and projecting towards said other bearing, a stub shaft rotatably mounted in said last mentioned bearing, a coupling secured to said stub shaft, said coupling having an open-topped seat into which the free end of said first mentioned shaft may be dropped to position said gas burner after said neck is positioned in said first mentioned bearing, and a pin interlocking said first mentioned shaft and said coupling whereby rotation of said sub shaft causes rotation of said first mentioned shaft and said burner.

2. In a broiler box, a pair of aligned bearings, a gas burner having a neck rotatably supported in one of said bearings, a shaft rigidly secured to said neck and projecting towards said other bearing, a sub shaft rotatably mounted in said last mentioned bearing, a coupling secured to said stub shaft, said coupling having an open-topped seat into which the free end of said first mentioned shaft may be dropped to position said gas burner after said neck is positioned in said first mentioned bearing, a projection extending at right angles to said coupling, said projection having an aperture extending therethrough, and a pin extending from said first mentioned shaft into said aperture to interlock said shaft with said coupling whereby rotation of said stub shaft causes rotation of said first mentioned shaft and of said burner.

3. In a broiler box, a pair of aligned bearings, a gas burner having a neck rotatably supported in one of said bearings, a shaft rigidly secured to said neck and projecting towards said other bearing, a pin projecting from said shaft, a stub shaft rotatably mounted in said last mentioned bearing, means to rotate said stub shaft, and a coupling secured to said stub shaft, said pin engaging said coupling to effect rotation of said burner about its axis when said stub shaft is rotated.

4. In a broiler box, a pair of aligned bearings, a gas burner having a neck rotatably supported in one of said bearings, a shaft rigidly secured to said neck and projecting towards said other bearing, a pin projecting from said shaft, a stub shaft rotatably mounted in said last mentioned bearing, means to rotate said stub shaft, and a coupling secured to said stub shaft, an apertured element projecting from said coupling, said coupling supporting the free end of said first mentioned shaft with said pin projecting into the aperture in said element.

5. In a broiler box, a pair of aligned bearings, a gas burner having a neck rotatably supported in one of said bearings, a shaft rigidly secured to said neck and projecting towards said other bearing, a pin normally projecting downwardly from said shaft, a stub shaft rotatably mounted in said last mentioned bearing, means to rotate said stub shaft, and a coupling secured to said stub shaft, an apertured element projecting from said coupling, said coupling supporting the free end of said first mentioned shaft with the free end of said pin projecting into the aperture in said element.

6. In a broiler box, a pair of aligned bearings, a gas burner having a neck rotatably supported in one of said bearings, a shaft rigidly secured to said neck and projecting towards said other bearing, a stub shaft rotatably mounted in said last mentioned bearing, and a coupling secured to said stub shaft, said coupling having an open-topped seat, the free end of said first mentioned shaft being supported in said open topped seat, and interengaging pin and aperture means on said coupling and first mentioned shaft whereby rotation of said stub shaft causes rotation of said first mentioned shaft and of said burner.

7. In a broiler box, a pair of aligned bearings, a gas burner having a neck rotatably supported in one of said bearings, a shaft rigidly secured to said neck and projecting towards said other bearing, a stub shaft rotatably mounted in said last mentioned bearing, a coupling secured to said stub shaft, and interengaging pin and aperture means on said coupling and first mentioned shaft whereby rotation of said stub shaft causes rotation of said first mentioned shaft and of said burner.

8. In a broiler box, a pair of aligned bearings, a gas burner having a neck rotatably supported in one of said bearings, a shaft rigidly secured to said neck and projecting towards said other bearing, a stub shaft rotatably mounted in said last mentioned bearing, a coupling secured to said stub shaft, said coupling having an open-topped seat into which the free end of said first mentioned shaft may be dropped to position said gas burner after said neck is positioned in said first mentioned bearing, and means to interlock said first named shaft with said coupling whereby rotation of said stub shaft causes rotation of said first mentioned shaft and of said burner.

9. In a broiler box, a pair of aligned bearings, a gas burner having a neck rotatably supported in one of said bearings, a shaft rigidly secured to said neck and projecting towards said other bearing, a stub shaft rotatably mounted in said last mentioned bearing, a coupling secured to said stub shaft, interengaging pin and aperture means on said coupling and first mentioned shaft whereby rotation of said stub shaft causes rotation of said first mentioned shaft and of said burner, and means to rotate said stub shaft.

JOHN E. CHAMBERS.

REFERENCES CITED

The following references are of record in the file of this patent:

UNITED STATES PATENTS

| Number | Name | Date |
|---|---|---|
| 560,330 | Stephenson | May 19, 1896 |
| 2,011,848 | Chambers | Aug. 20, 1935 |
| 2,417,977 | French | Mar. 25, 1947 |

FOREIGN PATENTS

| Number | Country | Date |
|---|---|---|
| 203,496 | Great Britain | Sept. 13, 1923 |
| 24,866 | Netherlands | Oct. 15, 1931 |